J. HUMPHREY.
WHEELS AND AXLES.

No. 191,286. Patented May 29, 1877.

Reduced.

Witnesses.
J. A. Heuser
W. E. Boardman

Inventor.
James Humphrey.
F. Curtis, Atty.

UNITED STATES PATENT OFFICE.

JAMES HUMPHREY, OF BOSTON, MASSACHUSETTS.

IMPROVEMENT IN WHEELS AND AXLES.

Specification forming part of Letters Patent No. 191,286, dated May 29, 1877; application filed July 17, 1876.

*To all whom it may concern:*

Be it known that I, JAMES HUMPHREY, of Boston, Suffolk county, Massachusetts, have invented certain Improvements in Running-Gear of Wheeled Vehicles, of which the following is a specification:

These improvements consist in a peculiar manner of mounting the wheels of wheeled vehicles for land conveyance, whereby certain advantages are gained, as hereinafter explained; the peculiarity of my method consisting in employing a wheel which is very dishing, and in giving a downward direction to the hub of such wheel and of the axle-journal with respect to the plane of the ground over which the wheels travel, and to the floor of the carriage, whereby the upper portion of the wheel, from its axis upward, is diverted from an upright position and directed horizontally, or practically so, under the body of the carriage.

Figure 1:
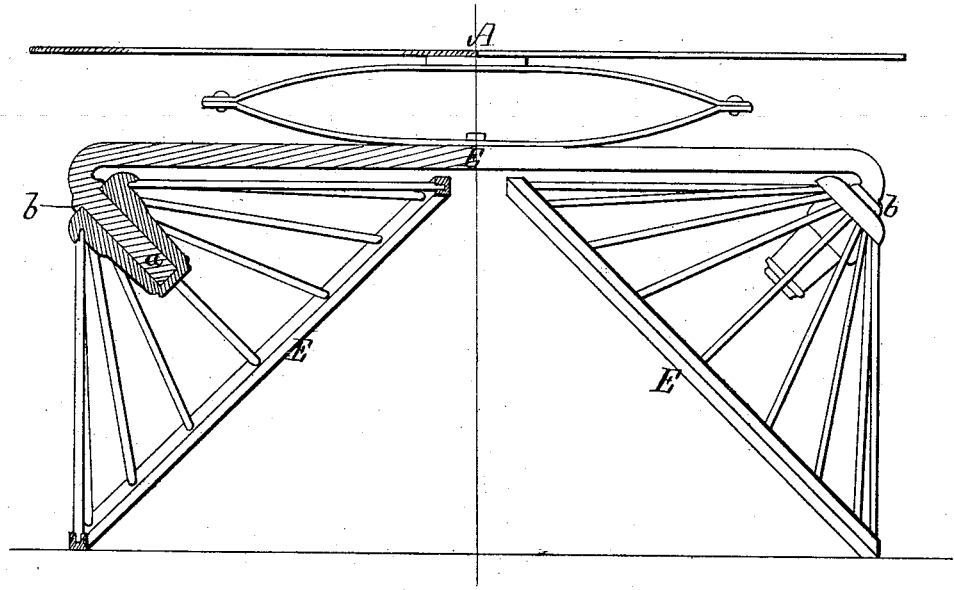
Figure 2:
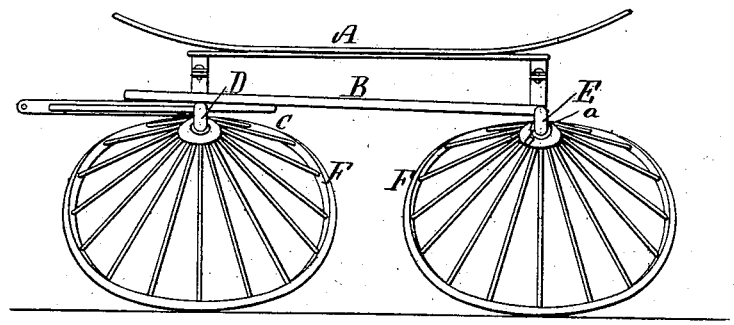

The drawings accompanying this specification represent, in Figure 1, a sectional elevation, and in Fig. 2 a side elevation, of the running-gear of a carriage containing my improvement.

In these drawings, A represents the floor or bottom of a wheeled vehicle for land conveyance by horses, while B represents the perch and C the fifth-wheel of the same, the forward axle being shown at D, and the rear axle at E.

In carrying out my invention I provide a set of wheels, F F, &c., each of which is very dishing, and I bend the journal *a* of each axle downward at such angle that the spokes of the lower portions of the wheel shall be upright, while the spokes of the upper portions of the wheel are horizontal, or practically so, and extend inward beneath the body of the carriage.

The angle of inclination of the axle-journal should be such as to conform to the extent to which the wheel is dished—that is, the angle at which the spokes depart from the hub in order that the lower spokes shall be vertical and the upper spokes horizontal.

In the present instance the angle of inclination of the journal and of the spokes is about forty-five degrees with the body of the carriage and the ground, and this will probably, in practice, be found to be nearest right, though I do not confine myself to it.

The thrust and strain upon the wheel may be distributed upon the under side and lower end of the axle-journal, and upon an enlargement or shoulder, *b*, of the journal immediately outside of the hub.

Figure 3:
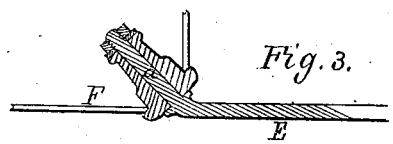

Though I have described and shown the axle as disposed over the wheels, it is obvious that it may extend between the wheels, as shown in Fig. 3 of the drawings, which is a section of the parts. In this instance the journal of the axle extends upward at an angle of forty-five degrees in lieu of downward, as before stated.

Having thus explained the nature and advantages of my invention, I claim, and desire to secure by Letters Patent, the following:

1. A dished wheel for vehicles, in which the spokes are set at an angle of about forty-five degrees with its axis, so that the rim will travel beneath the body of the vehicle, substantially as shown and described.

2. In combination with the dished wheel, as described and shown, the axle E, having its spindle bent, substantially as shown and described.

JAMES HUMPHREY.

Witnesses:
A. SCOTT KAULBACH,
W. E. BOARDMAN.